United States Patent
Cabodi et al.

(10) Patent No.: US 11,634,362 B2
(45) Date of Patent: Apr. 25, 2023

(54) PROCESS FOR THE MANUFACTURE OF A FUSED BLOCK HAVING A HIGH ZIRCONIA CONTENT

(71) Applicant: SAINT-GOBAIN CENTRE DE RECHERCHES ET D'ETUDES EUROPEEN, Courbevoie (FR)

(72) Inventors: Isabelle Cabodi, Cavaillon (FR); Pierrick Vespa, Aix-en-Provence (FR); Laurent Battu, Sorgues (FR); Olivier Citti, Cavaillon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 119 days.

(21) Appl. No.: 16/650,636

(22) PCT Filed: Oct. 9, 2018

(86) PCT No.: PCT/EP2018/077399
§ 371 (c)(1),
(2) Date: Mar. 25, 2020

(87) PCT Pub. No.: WO2019/072799
PCT Pub. Date: Apr. 18, 2019

(65) Prior Publication Data
US 2021/0363066 A1 Nov. 25, 2021

(30) Foreign Application Priority Data
Oct. 11, 2017 (FR) .................................. 1759529

(51) Int. Cl.
*C04B 35/48* (2006.01)
*C04B 35/657* (2006.01)
*C04B 35/626* (2006.01)

(52) U.S. Cl.
CPC ........ *C04B 35/481* (2013.01); *C04B 35/6265* (2013.01); *C04B 35/657* (2013.01);
(Continued)

(58) Field of Classification Search
CPC . C04B 35/481; C04B 35/6265; C04B 35/657; C04B 2235/3201;
(Continued)

(56) References Cited

U.S. PATENT DOCUMENTS

| 3,777,805 A | 12/1973 | Racasens et al. |
| 10,239,793 B2 * | 3/2019 | Cabodi ................. C04B 35/484 |

(Continued)

FOREIGN PATENT DOCUMENTS

| CN | 1059704 A | 3/1992 |
| CN | 103466697 A | 12/2013 |

(Continued)

OTHER PUBLICATIONS

JPH11130529A machine translation (Year: 1999).*

(Continued)

*Primary Examiner* — Karl E Group
*Assistant Examiner* — Cameron K Miller
(74) *Attorney, Agent, or Firm* — Ronald M. Kachmarik; Cooper Legal Group LLC

(57) ABSTRACT

A process for the manufacture of a refractory block including more than 80% zirconia, in percentage by weight based on the oxides. The process includes the following successive stages: melting, under reducing conditions, of a charge including more than 50% zircon, in percentage by weight, such as to reduce the zircon and obtain a molten material, application of oxidizing conditions to the molten material, casting of the molten material, and cooling until at least (Continued)

partial solidification of the molten material in the form of a block. Also, the process can include heat treatment of the block.

16 Claims, 1 Drawing Sheet

(52) U.S. Cl.
CPC ............... *C04B 2235/3201* (2013.01); *C04B 2235/3217* (2013.01); *C04B 2235/3248* (2013.01); *C04B 2235/422* (2013.01); *C04B 2235/602* (2013.01)

(58) Field of Classification Search
CPC .... C04B 2235/3217; C04B 2235/3248; C04B 2235/422; C04B 2235/602; C04B 35/484
See application file for complete search history.

(56) References Cited

U.S. PATENT DOCUMENTS

| | | | |
|---|---|---|---|
| 2009/0176642 | A1 | 7/2009 | Tomura |
| 2017/0225993 | A1* | 8/2017 | Demirbas ............... C04B 35/66 |

FOREIGN PATENT DOCUMENTS

| | | | |
|---|---|---|---|
| CN | 107207357 A | | 9/2017 |
| EP | 0354844 A1 | | 2/1990 |
| EP | 0403387 A1 | | 12/1990 |
| EP | 0633232 A1 | | 1/1995 |
| EP | 2418189 A1 | | 2/2012 |
| FR | 1191665 A | | 10/1959 |
| FR | 1208577 | * | 2/1960 |
| FR | 1208577 A | | 2/1960 |
| FR | 2142624 A1 | | 2/1973 |
| FR | 2701022 A1 | | 8/1994 |
| FR | 2723583 A1 | | 2/1996 |
| FR | 2920152 A1 | | 2/2009 |
| FR | 2925485 A1 | | 6/2009 |
| FR | 2953825 A1 | | 6/2011 |
| GB | 872759 A | | 7/1961 |
| JP | S39-024348 B | | 10/1964 |
| JP | H07-053258 A | | 5/1995 |
| JP | H1179854 | * | 3/1999 |
| JP | H11130529 A | * | 5/1999 |
| JP | 2005-526683 A | | 9/2005 |
| WO | 03/074445 A1 | | 9/2003 |
| WO | 2009/153517 A1 | | 12/2009 |
| WO | 2016/056146 A1 | | 4/2016 |
| WO | 2016/131948 A1 | | 8/2016 |
| WO | 2016131948 A1 | | 8/2016 |

OTHER PUBLICATIONS

FR1208577 machine translation (Year: 1960).*
Kontoyannis, C. G., and M. Orkoula. "Quantitative determination of the cubic, tetragonal and monoclinic phases in partially stabilized zirconias by Raman spectroscopy." Journal of materials science 29.20 (1994): 5316-5320. (Year: 1994).*
International Search Report corresponding International application PCT/EP2018/077399 dated Nov. 9, 2018, 11 pages.
Corresponding Chinese Application No. 201880066447.5, Chinese Office action dated Nov. 19, 2021.
Corresponding Japanese Application No. 2020-520077, Japanese Office action dated Aug. 17, 2022, 9 pages.

* cited by examiner

PROCESS FOR THE MANUFACTURE OF A FUSED BLOCK HAVING A HIGH ZIRCONIA CONTENT

TECHNICAL FIELD

The invention relates to a process for the manufacture of a fused refractory block having a high zirconia content, to a block obtained by this process, as well as to with a glass-melting furnace comprising such a block.

STATE OF THE ART

Among refractory blocks there are distinguished fused blocks, well known for the construction of glass-melting furnaces, and sintered blocks.

Unlike sintered blocks, fused blocks most frequently comprise an intergranular vitreous phase binding crystallized grains. The problems posed by sintered blocks and by fused blocks, and the technical solutions adopted for the resolution thereof, are consequently generally different. A composition developed for the manufacture of a sintered block is consequently a priori not employable as such to manufacture a fused block, and vice versa.

Fused blocks, often referred to as "electrofused blocks", are obtained through the melting of a mixture of appropriate raw materials in an electric arc furnace or by any other suitable technique. The molten material is then conventionally cast in a mold, then solidified. Generally, the product obtained then undergoes a cycle of controlled cooling to bring it to ambient temperature without fracturing. This operation is referred to as "annealing" by a person skilled in the art.

Among fused blocks, those having a very high zirconia content (VHZC) generally comprising more than 80%, or even more than 85%, by weight of zirconia are well known by virtue of the quality thereof of very high corrosion resistance and the ability thereof of not coloring the glass produced and of not generating defects in the latter.

FR 1 191 665 describes a process employing zircon for the manufacture of refractory products containing zirconia, alumina and silica. This process under strong reducing conditions leads to products presenting a high residual carbon content. There arise therefrom risks of exudation and/or of bubbling, generating defects in the glass. Furthermore, as virtually all of the phases are crystalline, these products do not make it possible to accommodate thermal variations well, in particular for blocks of large dimensions. The products also present a porosity incompatible with employment in the form of blocks of large dimensions. Consequently, these products are solely employed as a source of raw materials (in particulate form) for the manufacture of other refractory products.

EP 403 387 describes fused cast products having a high zirconia content containing, in percentages by weight, 4% to 5% silica $SiO_2$, approximately 1% alumina $Al_2O_3$, 0.3% sodium oxide and less than 0.05% $P_2O_5$.

FR 2 701 022 describes fused cast products having a high zirconia content containing, in percentages by weight, 0.05% to 1.0% $P_2O_5$ and 0.05% to 1.0% boron oxide $B_2O_3$.

FR 2 723 583 describes fused cast products having a high zirconia content containing, in percentages by weight, 3% to 8% silica $SiO_2$, 0.1% to 2.0% alumina $Al_2O_3$, 0.05% to 3.0% boron oxide $B_2O_3$, 0.05% to 3% BaO+SrO+MgO, 0.05% to 0.6% $Na_2O+K_2O$ and less than 0.3% $Fe_2O_3+TiO_2$.

Fused blocks having a very high zirconia content such as ER 1195, produced and marketed by the company SEFPRO, are conventionally made under oxidizing conditions. Today they are widely employed in glass-making furnaces. However, the high cost thereof may restrict their use, particularly for the superstructures of glass-making furnaces.

Consequently, there is a need for a process for the manufacture of a fused block having a very high zirconia content which is less costly than current processes.

The object of the present invention is to satisfy this need.

SUMMARY OF THE INVENTION

The invention relates to a process for the manufacture of a refractory block comprising more than 80%, preferably more than 85%, zirconia in percentage by weight based on the oxides, said process comprising the following successive stages:
 a) melting, under reducing conditions, of a charge comprising more than 50% zircon, in percentage by weight, such as to reduce the zircon and obtain a molten material,
 b) application of oxidizing conditions to the molten material,
 c) casting of said molten material,
 d) cooling until at least partial solidification of the molten material in the form of a block,
 e) optionally, heat treatment of said block, in particular annealing heat treatment.

As will be observed in greater detail in the continuation of the description, a process according to the present invention advantageously makes it possible, through melting of a charge containing all of the oxides of the block to be manufactured, to rapidly obtain and at a reduced cost a refractory block employable in a glass-making furnace. In particular, the zircon is introduced directly into the charge, with the other raw materials, without intermediate treatment.

A process according to the invention may also comprise one or more of the following optional characteristics:
 stage a) is continued until the silica content in the molten material is less than 15%;
 stage b) is continued until the carbon content in the molten material is less than 500 ppm;
 in stage a), the charge comprises more than 70%, preferably more than 80%, zircon, in percentage by weight based on the charge;
 in stage a), the charge presents a composition, in percentage by weight based on the charge, such that the quantity of reducing agent, preferably of carbon, is greater than 2.0%, preferably greater than 4.0%, and/or less than 10.0%, preferably less than 8.0%;
 the charge comprises a quantity of alumina greater than 0.2% and less than 3.0%, preferably greater than 0.5% and/or less than 2.5%, preferably less than 1.5%, in percentage by weight based on the charge;
 the charge comprises a quantity of a source of sodium, preferably of sodium carbonate, greater than 0.5% and/or less than 5.0%, preferably greater than 1.0% and less than 4.5%, in percentage by weight based on the charge;
 the charge comprises a total quantity of stabilizer of the zirconia greater than 1.0%, preferably greater than 4.0%, and/or less than 10.0%, in percentage by weight based on the charge.

The invention additionally relates to a block obtained or likely to have been obtained by a process according to the invention. For the sake of clarity, such a block is hereinafter referred to as "block according to the invention".

The block according to the invention preferably presents a chemical composition such that, for a total of 100%:
$ZrO_2$: more than 82.0% and less than 97.0%,
$SiO_2$: more than 0.5% and less than 15.0%,
$Al_2O_3$: more than 0.2%,
$Na_2O$: more than 0.1%,
oxide species other than $ZrO_2$, $SiO_2$, $Al_2O_3$ and $Na_2O$: less than 10.0%,
and, more preferably, a chemical composition such that, for a total of 100%:
$ZrO_2$: more than 86.0%,
$SiO_2$: more than 2.5%,
$Al_2O_3$: 1.0-3.0%,
$Na_2O$: less than 0.5%,
oxide species other than $ZrO_2$, $SiO_2$, $Al_2O_3$ and $Na_2O$: less than 5.0%.

Preferably, at ambient temperature, in percentages by weight, more than 80% of the zirconia of the block is monoclinic or more than 25% of the zirconia is tetragonal.

More preferably, the block according to the invention presents a weight of more than 10 kg.

The present invention furthermore relates to a glass-melting furnace comprising a block according to the invention, in particular in the regions raised to temperatures exceeding 1000° C. and, especially, in the regions destined to be in contact with the molten glass or in contact with the atmosphere of the melting furnace, in particular in superstructures. In particular, the invention relates to a glass-melting furnace comprising a superstructure comprising or constituted by blocks according to the invention.

Definitions

A block is conventionally said to be "fused" when it is obtained by a process employing a melting of a charge until a molten material is obtained, then a solidification of this material by cooling.

The "charge" is constituted by the totality of the raw materials introduced into the furnace.

A "molten material" is a liquid mass which, in order to conserve the shape thereof, requires to be held in a container. It may have some solid particles therein, but in a quantity insufficient for them to be capable of structuring said mass.

A block is an object, all the dimensions of which exceed 10 mm, preferably exceed 50 mm, preferably exceed 100 mm, and which, unlike a coating, is obtained through a process comprising operations of molding and demolding. A block may, for example, have a parallelepipedal general shape or, alternatively, a shape of "cruciform" type, described for example in FR 2 142 624 or EP 354 844.

Unless otherwise mentioned, all the contents in relation to the charge are percentages by weight based on the charge.

A particle is an object, all the dimensions of which are less than or equal to 10 mm, preferably less than 5 mm, preferably less than 2 mm.

A particle "made of" a constituent, or "of a" constituent, for example a particle "of alumina" or "made of alumina", is a particle comprising more than 80%, preferably more than 90%, preferably more than 95%, preferably more than 98%, preferably more than 99%, of this constituent, in percentage by weight based on the particle.

For the sake of clarity, the chemical formulae of the oxides are employed to designate the contents of these oxides in a composition. For example, "$ZrO_2$", "$SiO_2$" or "$Al_2O_3$" designate the contents of these oxides and "zirconia", "silica" and "alumina" are employed to designate crystalline phases of these oxides constituted of $ZrO_2$, $SiO_2$ and $Al_2O_3$, respectively. The elements Zr, Si and Al may nevertheless be also present under other phases, in particular in the form of zircon, that is to say of $ZrSiO_4$ phase.

Unless otherwise mentioned, all the contents of oxides in a block according to the invention are percentages by weight based on the oxides. A content by weight of an oxide of a metallic element relates to the total content of this element expressed in the form of the most stable oxide, in conformity with the normal convention of the industry.

$HfO_2$ is not chemically dissociable from $ZrO_2$. However, according to the present invention, $HfO_2$ is not deliberately added in the charge. $HfO_2$ consequently designates only the traces of hafnium oxide, this oxide always being naturally present in the sources of zirconium oxide at contents of generally less than 5%, generally less than 2%. In a block according to the invention, the content by weight of $HfO_2$ is preferably less than 5%, preferably less than 3%, preferably less than 2%. For the sake of clarity, the total content of zirconium oxide and of traces of hafnium oxide may be designated immaterially by "$ZrO_2$" or by "$ZrO_2+HfO_2$". $HfO_2$ is not, as a consequence, comprised within the "oxide species other than $ZrO_2$, $SiO_2$, $Al_2O_3$ and $Na_2O$".

By "impurities" there are understood the inevitable constituents introduced with the raw materials or resulting from reactions with these constituents. The impurities are not necessary constituents and are merely tolerated. For example, the compounds forming part of the group of oxides, nitrides, oxynitrides, carbides, oxycarbides, carbonitrides and metallic species of iron, titanium, vanadium and chromium are impurities.

BRIEF DESCRIPTION OF THE FIGURES

Other characteristics and advantages of the present invention will emerge further upon reading the detailed description below and upon examination of the appended drawing, wherein.

DETAILED DESCRIPTION OF THE INVENTION

Process

Figure 1:
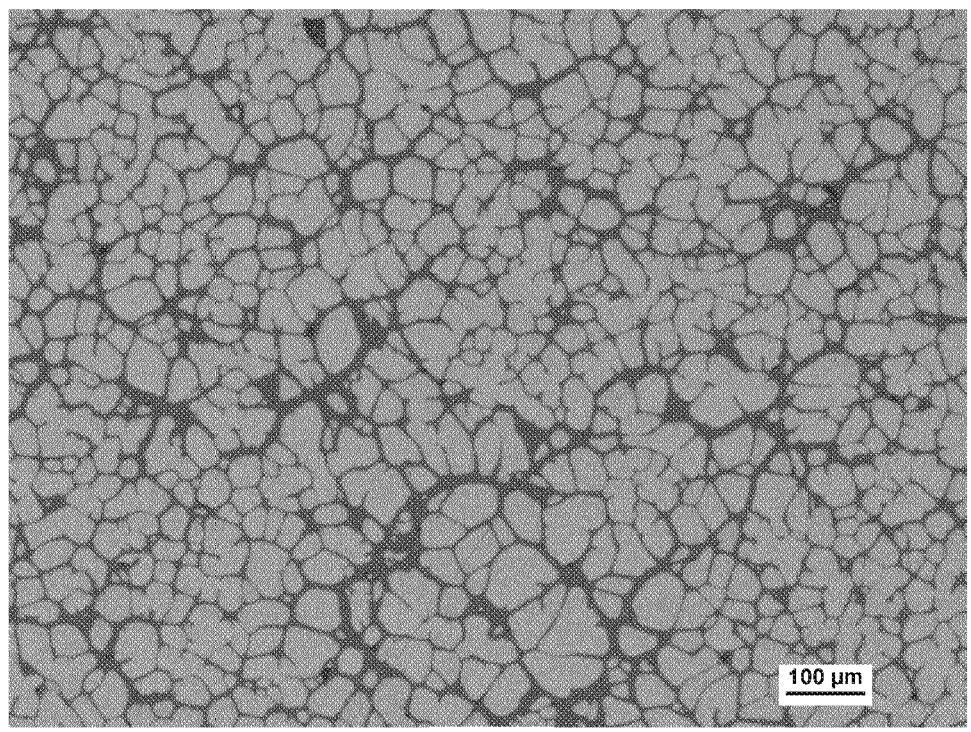
FIG. 1 is a photograph of the microstructure of the block of example 2.

The composition of the block manufactured following a process according to the invention depends on the charge being fused but also on the conditions under which the reducing and oxidizing conditions in stages a) and b), respectively, are applied. Mastery of these different parameters, as a function of the composition of the block desired, is fully known to a person skilled in the art.

Preferably, the parameters of the process are modified such that the block obtained in stage d) presents a chemical composition such that:
$ZrO_2$: more than 82.0%, preferably more than 84.0%, preferably more than 86.0%, and/or less than 97.0%, or even less than 95.0%, or even less than 94.0%, $ZrO_2$ constituting the remainder to 100%, and/or
$SiO_2$: more than 0.5%, preferably more than 1.5%, preferably more than 2.5%, preferably more than 4.0%, or even more than 6.0%, more than 8.0%, more than 8.5%, and/or less than 15.0%, or even less than 12.0%, less than 10.0%, or even less than 8.0%, and/or
$Al_2O_3$: more than 0.2%, preferably more than 1.0%, and/or less than 3.0%, preferably less than 2.0%, and/or $Na_2O$: more than 0.1%, or even more than 0.2%, and/or less than 0.6%, preferably less than 0.5%, or even less than 0.4%, and/or $B_2O_3$: more than 0.1%, or even more than 0.2%, and/or less than 0.6%, preferably less than 0.5%, or even less than 0.4%, and/or oxide species other than $ZrO_2$, $SiO_2$, $Al_2O_3$, $Na_2O$ and $B_2O_3$: less than 10.0%, preferably less than 9.0%, more preferably less than 8.0%, less than 5.0%, or even less than 3.0%, or less than 2.0%, or less than 1.0%, or less than 0.5%.

The charge comprises more than 50% by weight of zircon.

The zircon may provide the zirconium oxide $ZrO_2$ in whole or in part. If necessary, particles of zirconia, possibly stabilized, may be added to the charge.

Preferably, the charge is also modified, in a well-known manner, as a function of the stabilization of the zirconia desired in the block obtained in stage d). In particular, the charge may comprise more than 0.5%, more than 1.5%, more than 3.0%, more than 4.0%, more than 5.0%, or even more than 6.0%, and/or less than 10.0%, less than 9.0%, or even less than 8.0%, of stabilizer of the zirconia, in particular CaO and/or $Y_2O_3$ and/or MgO and/or $CeO_2$, preferably of CaO and/or of $Y_2O_3$. In particular, the charge may comprise more than 0.5%, more than 1.5%, more than 2.0% and/or less than 5.0%, less than 4.0%, or even less than 3.0%, $Y_2O_3$.

According to one embodiment, the charge is modified such that more than 80%, preferably more than 90%, or even more than 99% or substantially 100% of the zirconia of the block is monoclinic at ambient temperature, in percentages by weight.

According to another embodiment permitting improvement of the behavior of the block vis-à-vis joint sealing, bubbling and thermal variations, the charge is modified such that less than 75%, preferably less than 70%, of the zirconia of the block is monoclinic. Preferably, the charge is modified such that more than 25%, preferably more than 30%, of the zirconia of the block is stabilized, preferably in tetragonal form, at ambient temperature, in percentages by weight.

Preferably, the charge is modified such that the totality of the oxides $Al_2O_3$, $B_2O_3$, $Na_2O$, $K_2O$, $Y_2O_3$, BaO, SrO, MgO, CaO, $CeO_2$, $Fe_2O_3$, $TiO_2$, $Ta_2O_5$ and $Nb_2O_5$ represents less than 10.0%, preferably less than 9.0%, more preferably less than 8.0%, or even less than 5.0%, or even less than 3.0%, of the weight of the block obtained in stage d).

Preferably, the charge is modified such that each of the oxides $Al_2O_3$, $B_2O_3$, $Y_2O_3$ and CaO represents less than 3.0%, preferably less than 2.0%, more preferably less than 1.5%, of the weight of the block obtained in stage d).

Preferably, the charge is modified such that each of the oxides $Na_2O$, $K_2O$, BaO, SrO, MgO, $CeO_2$, $Fe_2O_3$, $TiO_2$, $Ta_2O_5$ and $Nb_2O_5$ represents less than 1.0%, preferably less than 0.9%, more preferably less than 0.8%, or even less than 0.6%, or even less than 0.5%, of the weight of the block obtained in stage d).

Preferably, the oxide species other than $ZrO_2$, $SiO_2$, $Al_2O_3$, $Na_2O$, $B_2O_3$, $Y_2O_3$, CaO, MgO and $CeO_2$ are impurities.

Preferably, the charge is constituted by a mixture of powders.

Preferably, the charge presents a composition, in percentage by weight, such that:

particles of zircon: more than 60%, preferably more than 70%, preferably more than 80%, preferably more than 85%, and/or particles of a reducing agent, preferably of carbon: more than 2.0%, preferably more than 3.0%, preferably more than 4.0%, or even more than 5.0%, and/or less than 10.0%, preferably less than 8.0%, and/or particles of alumina: more than 0.2%, preferably more than 0.5%, or even more than 0.8%, and/or preferably less than 3.0%, preferably less than 2.5%, preferably less than 2.0%, or even less than 1.5%, or even less than 1.0%, and/or particles of a source of sodium, preferably of sodium carbonate: more than 0.5%, preferably more than 1.0%, preferably more than 1.5%, preferably more than 2.0%, or even more than 3.0%, or even more than 3.5%, and/or preferably less than 5.0%, preferably less than 4.5%, or even less than 4.0%, and/or particles of boron oxide: more than 0.5%, or even more than 1.0%, or even more than 1.5%, or even more than 2.0% and/or preferably less than 5.0%, preferably less than 4.0%, or even less than 3.0%, and/or other particles, that is to say other than the particles of zircon, of reducing agent, of alumina, of source of sodium and of boron oxide: less than 10%, preferably less than 5%, or even less than 3%, or even less than 1%, or even less than 0.5%, or even less than 0.1%.

The particles of reducing agent are preferably particles of coke and/or particles of wood charcoal, and/or particles of aluminum. Preferably, the particles of reducing agent are particles of coke, preferably comprising, in percentage by weight, more than 95.0% carbon, or even more than 96.5% carbon, or even more than 98.0% carbon, or even more than 99.0% carbon. Preferably, the particles of reducing agent are particles of pitch coke.

Preferably, the charge comprises particles of alumina, on the one hand, and particles of a source of sodium and/or particles of a source of boron, on the other hand. Advantageously, there results therefrom the formation of a silicated phase conferring good resistance to thermomechanical stresses.

In one embodiment, particles of alumina and particles of a source of sodium are added to the bath of molten material, in stage b).

The zircon and/or the reducing agent and/or the alumina and/or the source of sodium and/or the source of boron may be provided in forms other than the particulate form, in the same quantities. The particulate form is however preferred.

In stage a), melting is carried out under reducing conditions in order to dissociate, at least partiality, preferably substantially completely, the zircon into the form of zirconia and silica. The silica is progressively volatilized. The quantity of the other oxides present in the charge is substantially unaffected by the reducing conditions.

The reducing conditions are consequently maintained until the silica content desired in the block is achieved. The progression to oxidizing conditions, in stage b), then permits stabilization of the silica content.

All techniques which make it possible to obtain reducing conditions, well known to a person skilled in the art, are possible.

In particular, melting is preferably carried out through a resistance furnace operation, the electrodes being immersed in the charge, or through the combined action of a short electric arc, preferably without agitation. The voltage and current required to obtain a short arc depend on numerous parameters, well known to a person skilled in the art, such as the size of the furnace, the number and the size of the electrodes.

Preferably, melting is operated at a temperature greater than 2000° C., preferably during a period of less than 2 hours, or even less than 1 hour 30 minutes, or even less than 1 hour and, preferably, of greater than 30 minutes, or even greater than 45 minutes.

Preferably, the reducing conditions are maintained at least until more than 80%, more than 90%, preferably substantially 100%, of the charge, in percentage by weight, is transformed into molten material.

In stage b), the bath of molten material obtained at the end of stage a) is maintained in a molten state and subjected to oxidizing conditions.

All techniques which make it possible to obtain oxidizing conditions are envisaged.

The oxidizing conditions are preferably obtained through the combined action of a moderately long electric arc, not producing reduction, and of an agitation favoring reoxidation. Preferentiality, the melting process with a long arc described in patent FR1 208 577 and the patents of addition Nos. 75893 and 82310 thereof is employed. This process consists in employing an electric arc furnace, the arc of which flows between the bath of molten material and at least one electrode distant from this bath, and in regulating the length of the arc such that the reducing action thereof is reduced to a minimum value, while maintaining an oxidizing atmosphere above the molten bath and while agitating said bath, either, on the one hand, through the action of the arc itself or, on the other hand, by sparging an oxidizing gas (air or oxygen, for example) into the bath or, furthermore, by adding to the bath substances which release oxygen, such as peroxides or nitrates.

The application of oxidizing conditions acts principally on the residual carbon content. Preferably, the oxidizing conditions are maintained until the carbon content in the bath of molten material is less than 250 ppm, or even less than 200 ppm, or even less than 100 ppm.

Preferably, the duration of stage b) is less than 1 hour, or even less than 45 minutes, or even less than 30 minutes and greater than 5 minutes, or even 10 minutes, or even 20 minutes.

Stage b) permits the utilization predominantly of the zircon as raw material while limiting the residual carbon content and the porosity in the blocks obtained. The cost of manufacture of the blocks is thereby reduced.

In stage c), the molten material is conventionally cast in a mold.

Preferably, the mold presents dimensions permitting the manufacture of a block, all the dimensions of which exceed 100 mm, and/or a block of more than 10 kg.

In stage d), the cooling is preferably carried out at a rate of less than 100° C./h, preferably less than 50° C./h, preferably less than 20° C./h, a rate of approximately 10° C. per hour being very appropriate.

In stage e), the block resulting from stage d) may be subjected to an annealing. In particular, when the molten material cast in the mold is at least partially solidified such as to obtain a rigid mass, this mass is extracted from the mold and placed in an environment facilitating the control of the cooling thereof.

The process may also comprise an additional stage of machining making it possible to confer the desired dimensions on the block.

Block

The block obtained in stage d) comprises preferably more than 80%, preferably more than 85%, zirconia.

The very high zirconia content makes it possible to respond to the requirements of high corrosion resistance without generation of defects detrimental to the quality of the glass manufactured.

Preferably, more than 80%, more than 90%, more than 95%, preferably substantially 100%, of the zirconium of the block is in the form of zirconia, in percentage by weight.

The presence of silica is advantageous, the formation of an intergranular vitreous phase making it possible to effectively accommodate the variations in volume of the zirconia during the reversible allotropic transformation thereof. An excessively high silica content may however generate defects in the glass through the release of stones (fragments of refractory block resulting from a loss of cohesion of the block) and degrade the corrosion resistance.

The residual carbon content, in percentage by weight based on the block, is preferably less than 500 ppm, preferably less than 250 ppm, preferably less than 200 ppm, or even less than 100 ppm.

Preferably, the total porosity of the block is less than 15%, or even less than 10%, or even less than 5%.

According to an embodiment particularly concerning blocks for the superstructures or the tank, the total porosity of the block is less than 5%, or even less than 2%, or even less than 1%.

EXAMPLES

The following nonlimiting examples are given with the objective of illustrating the invention.

The following raw materials were employed in these examples:
zircon sand containing 33% silica,
type AC44 alumina sold by the company Pechiney and containing on average 99.4% alumina,
sodium carbonate, source of $Na_2O$,
pitch coke, comprising approximately 98% carbon.

In stage a), the charge is introduced into a tank of approximately 1 m diameter of a single-phase electric arc furnace of Héroult type provided with two graphite electrodes of diameter 130 mm. For examples 1 to 5, all the raw materials are mixed in the proportions given in table 1 and placed in the tank prior to commencement of the melting. Example 6 differs from examples 1 to 5 in that, at the commencement of stage b), the alumina and the sodium carbonate are introduced into the bath of molten material obtained from the other raw materials.

The charge is then fused under reducing conditions through a resistance furnace operation, with a voltage of approximately 130 V, a current of 2300 A and a specific electrical energy supplied of greater than 2 kWh/kg charged.

In stage b), the bath of molten material is maintained for 15 to 40 minutes under oxidizing conditions employing a long arc, as described in patent FR 1 208 577, with a voltage of approximately 210 V and, for examples 2 and 4, injecting respectively 240 or 120 liters of oxygen.

The molten material is then cast in a mold in order to obtain blocks of format 180×180×350 mm.

TABLE 1

(percentages by weight based on the charge)

| Example | 1 | 2 | 3 | 4 | 5 | 6 |
|---|---|---|---|---|---|---|
| Zircon (z) | 89.2% | 88.0% | 88.6% | 88.6% | 83.1% | 88.0% |
| Pitch coke (c) | 6.7% | 6.6% | 6.7% | 6.7% | 6.3% | 6.6% |

TABLE 1-continued (percentages by weight based on the charge)

| Example | 1 | 2 | 3 | 4 | 5 | 6 |
|---|---|---|---|---|---|---|
| Alumina (a) | 0.7% | 0.7% | 0.7% | 0.7% | 0.7% | 0.7% |
| Sodium carbonate (s) | 3.4% | 4.7% | 4.0% | 4.0% | 3.8% | 4.7% |
| Lime | — | — | — | — | 4.7% | — |
| Yttrium oxide | — | — | — | — | 1.4% | — |
| Stage of introduction of (a) and (s) | a) | a) | a) | a) | a) | b) |
| Injection of oxygen | no | yes | no | yes | no | no |

The chemical analysis of the blocks obtained is given in table 2; it is an average chemical analysis carried out by X-ray fluorescence spectroscopy and given in percentages by weight.

The crystalline phases were identified by X-ray diffraction and are given in table 2; "Z-m" signifies monoclinic zirconia and "Z-t" signifies tetragonal zirconia.

TABLE 2

| Example | 1 | 2 | 3 | 4 | 5 | 6 |
|---|---|---|---|---|---|---|
| $ZrO_2$ | 88.5% | 88.4% | 89.0% | 86.4% | 84.7% | 90.8% |
| $SiO_2$ | 8.7% | 9.1% | 8.9% | 11.1% | 10.3% | 7.1% |
| $Al_2O_3$ | 1.6% | 1.9% | 1.5% | 1.7% | 1.7% | 1.5% |
| $Na_2O$ | 0.3% | 0.3% | 0.3% | 0.4% | 0.4% | 0.2% |
| CaO | — | — | — | — | 1.9% | — |
| $Y_2O_3$ | — | — | — | — | 0.7% | — |
| oxides other than the foregoing | 0.9% | 0.3% | 0.3% | 0.4% | 0.3% | 0.4% |
| residual C (ppm) | <200 | 40 | <200 | <200 | <200 | <200 |
| Phase(s) | Z-m | Z-m | Z-m | Z-m | Z-m, Z-t | Z-m |

The blocks obtained present a density of between 5.1 and 5.4 and a structure in the form of zirconia dendrite in a silicated phase (FIG. 1 corresponds to example 2).

Figure 2:
FIG. 2 is a photograph of the block of example 2.

These examples have permitted it to be observed that, by employing zircon as principal source of zirconia, it is possible to obtain blocks presenting a very high zirconia content which are substantially devoid of fissures, as represented in FIG. 2.

These blocks are advantageously perfectly suited to employment under industrial conditions.

Furthermore, other trials have permitted it to be confirmed that the properties recognized for the materials having a very high zirconia content, in particular the resistance to corrosion by the vapors of a glass-making furnace, are not substantially degraded through the employment of the process according to the invention.

A sample of a block according to the invention (example 2) was compared with a sample of the product ER 1195. The samples, in the form of bars having a length of 100 mm and a diameter of 24 mm, are subjected to two cycles of 4 hours at 1500° C., the raising and lowering in temperature being 100° C./h. The change in volume (in %) of the sample following these two cycles, corresponding to the value of exudation expressed in %, is measured. A value of less than 3% was obtained, in accordance with that of the reference product.

Of course, the present invention is not limited to the embodiments described and represented provided in terms of illustrative and nonlimiting examples.

The invention claimed is:

1. A process for the manufacture of a refractory block comprising more than 80% zirconia, in percentage by weight based on the oxides, said process comprising the following successive stages:
    a) melting, under reducing conditions, of a charge comprising more than 50% zircon, in percentage by weight, such as to reduce the zircon and obtain a molten material,
    b) application of oxidizing conditions to the molten material,
    c) casting of said molten material,
    d) cooling until at least partial solidification of the molten material in the form of a block,
    e) optionally, heat treatment of said block.

2. The process as claimed in claim 1, wherein stage a) is continued until a silica content in the molten material is less than 15% and stage b) is continued until a carbon content in the molten material is less than 500 ppm.

3. The process as claimed in claim 1, wherein the charge comprises more than 80% zircon, in percentage by weight based on the charge.

4. The process as claimed in claim 1, wherein the charge presents a composition, in percentage by weight based on the charge, such that the quantity of reducing agent is greater than 2.0% and less than 10.0%.

5. The process as claimed in claim 4, wherein the quantity of reducing agent is greater than 4.0% and less than 8.0%.

6. The process as claimed in claim 1, wherein the charge comprises a quantity of alumina greater than 0.2% and less than 3.0%, in percentage by weight based on the charge.

7. The process as claimed in claim 6, wherein the quantity of alumina is greater than 0.5% and less than 2.5%.

8. The process as claimed in claim 6, wherein the quantity of alumina is less than 1.5%.

9. The process as claimed in claim 1, wherein the charge comprises a quantity of a source of sodium greater than 0.5% and less than 5.0%, in percentage by weight based on the charge.

10. The process as claimed in claim 9, wherein the quantity of source of sodium is greater than 1.0% and less than 4.5%.

11. The process as claimed in claim 1, wherein the charge comprises a total quantity of stabilizer of the zirconia greater han 1.0% and less than 10.0%.

12. The process as claimed in claim 11, wherein the charge comprises a total quantity of stabilizer of the zirconia greater than 4.0%.

13. The process as claimed in claim 1, wherein the charge is modified such that the block obtained in stage d) presents a chemical composition such that, for a total of 100%:
    $ZrO_2$: more than 82.0% and less than 97.0%,
    $SiO_2$: more than 0.5% and less than 15.0%,
    $Al_2O_3$: more than 0.2%,
    $Na_2O$: more than 0.1%,
    oxide species other than $ZrO_2$, $SiO_2$, $Al_2O_3$ and $Na_2O$: less than 10.0%.

14. The process as claimed in claim 13, wherein the charge is modified such that the block obtained in stage d) presents a chemical composition such that, for a total of 100%:
    $ZrO_2$: more than 86.0%,
    $SiO_2$: more than 2.5%,
    $Al_2O_3$: 1.0-3.0%,
    $Na_2O$: less than 0.5%,
    oxide species other than $ZrO_2$, $SiO_2$, $Al_2O_3$ and $Na_2O$: less than 5.0%.

15. The process as claimed in claim 1, configured such that, at ambient temperature and in percentages by weight, more than 80% of the zirconia of said block is monoclinic or that more than 25% of the zirconia is tetragonal.

16. The process as claimed in claim 1, configured such that said block presents a weight of more than 10 kg.

* * * * *